April 9, 1957 J. G. BENNETT 2,787,970
CHILD'S RIDING DEVICE
Filed March 16, 1955
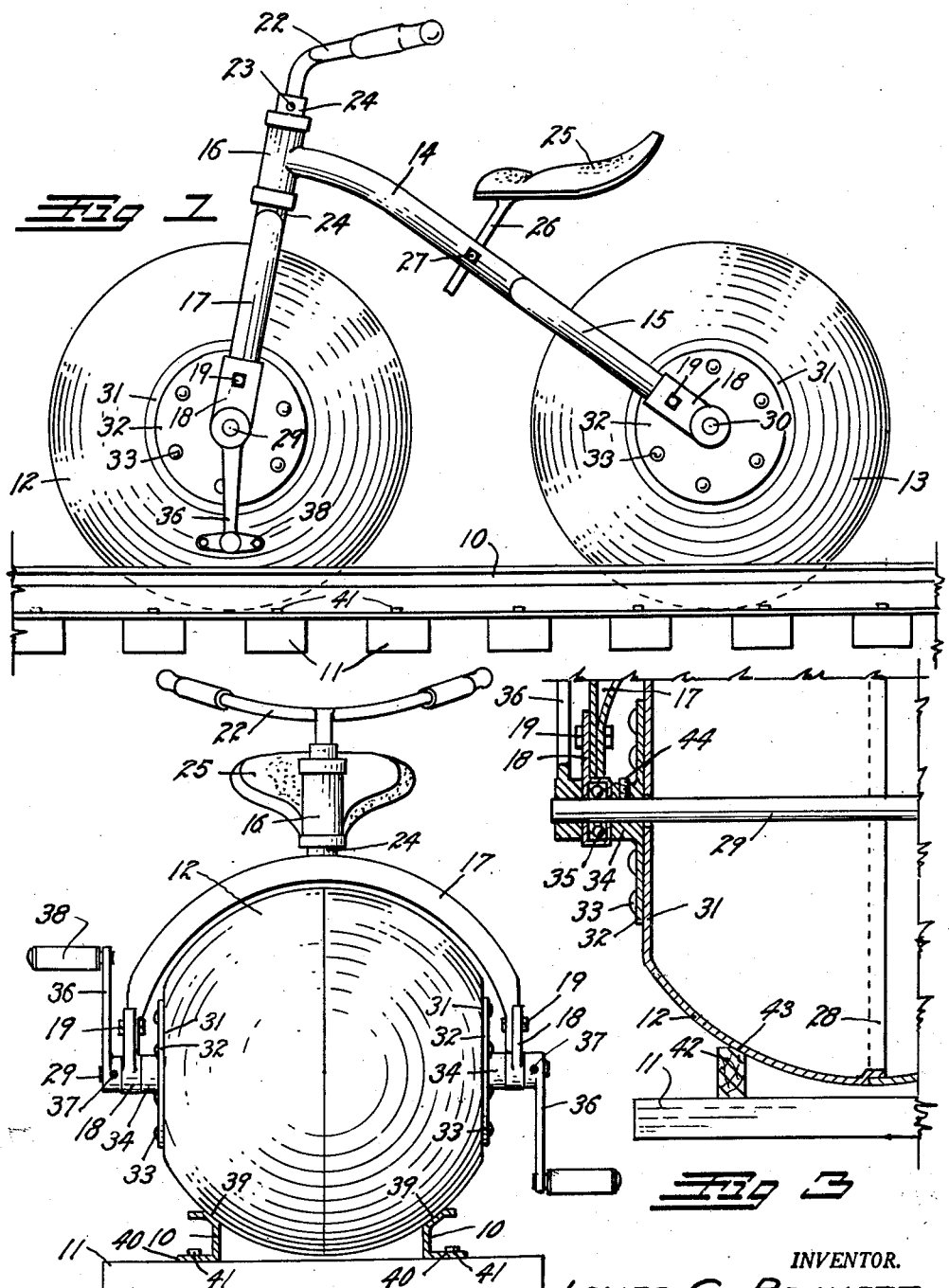
INVENTOR.
JAMES G. BENNETT
BY
ATTORNEY United States Patent Office 2,787,970
Patented Apr. 9, 1957

2,787,970
CHILD'S RIDING DEVICE
James G. Bennett, Denver, Colo.
Application March 16, 1955, Serial No. 494,600
2 Claims. (Cl. 105—95)

This invention relates to a riding device for children, and has for its principal object the provision of a simple two-wheeled, bicycle-like vehicle which will follow a track laid out in any desired design, and the wheels of which will consist of spherical globes which will react frictionally against the track to maintain the vehicle vertical regardless of the skill of the rider.

Another object of the invention is to replace the usual wheels of a bicycle-like vehicle with rotating spheres to increase the interest and appearance of the riding device, and which will provide self-centering and track-following means for the vehicle.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved child's riding device in position on a guide track structure;

Fig. 2 is a front view thereof; and

Fig. 3 is an enlarged, fragmentary, detail section, illustrating a means of mounting the rotating spheres on the device.

The improved child's riding device is designed to travel along an endless track structure consisting of two parallel guide rails 10 mounted on any suitable supporting structure such as cross ties 11. The riding device or vehicle is supported on two rolling, hollow, spherical wheels, a front wheel 12 and a rear wheel 13, mounted in a bicycle-like relation by means of a suitable passenger-carrying frame.

As illustrated, the frame comprises a rearwardly and downwardly extending frame tube 14 which terminates at its rear extremity in a relatively wide inverted-U-shaped rear fork member 15. The forward extremity of the frame tube 14 terminates in a rearwardly inclined tubular front fork barrel 16 similar to the fork barrels employed on conventional tricycles, bicycles and the like. A stem 24 formed on a relatively wide inverted-U-shaped front fork member 17 extends through and is rotatably mounted in the fork barrel 16, as is usual in bicycle construction.

The two fork members are preferably formed of arcuately bent tubing. The four lower extremities of the two fork members are flattened, as shown in Fig. 3, and these flattened extremities are secured in conventional tricycle-type bearing fittings 18 by means of suitable attachment bolts 19, as is usual in tricycle constructions.

The stem 24 of the front fork member 17 extends upwardly through the fork barrel 16 and suitable bicycle-type handle bars 22 are mounted therein at any desired height by means of a suitable set screw 23. A cycle-type seat 25 of any suitable design is mounted on a seat post 26 which extends through the frame tube 14 and which can be secured at any desired height therein by means of a suitable set screw 27.

The front and rear wheels 12 and 13 are similar in construction and each comprises a pair of fitted together, similar, hollow, hemispherical bowls or shells formed of relatively light sheet metal or other suitable material. One shell of each pair of shells is provided with an annular, inset, peripheral lip 28 into which the periphery of the adjacent shell tightly fits as shown in Fig. 3. The two shells of the front wheel 12 are concentrically mounted about a front axle 29, and the two shells of the rear wheel 13 are similarly concentrically mounted about a rear axle 30. The shells of both wheels have a semi-flattened portion 31 through which the axles 29 and 30 concentrically pass so that when the shells are assembled, they form hollow, oblate spheroids.

A mounting disc 32 is concentrically mounted on the flattened portion 31 of each shell in any desired manner such as by means of suitable bolts or rivets 33. The mounting discs 32 are formed with tubular hubs 34 which can be locked to the axles 29 and 30 by means of suitable set screws 44 to fixedly maintain each pair of shells together and to fixedly mount the pairs as a unit on their respective axles 29 and 30. The axles 29 and 30 project oppositely outward from the wheels and extend through conventional anti-friction bearings 35 contained in the bearing fittings 18.

The front axle 29 extends outwardly beyond both of the bearing fittings 18 on the front fork member 17, and a pedal crank 36 is mounted on each outwardly extending portion. The pedal cranks 36 are locked to the shaft extremities in oppositely-extending radial relation by means of suitable set screws 37 or in any other desired manner, and each crank is provided with a conventional bicycle-type foot pedal 38.

It can be seen that if a child is positioned on the seat 25 with his hands gripping the handle bars 22 and with his feet resting on the foot pedals 38, he will be in the usual position of a child riding a conventional bicycle. With this improved device, however, the frictional engagement between the spherical wheels 12 and 13 and the track 10 will prevent the device from tipping or falling sidewardly. The device can be propelled around the track by actuation of the pedals 38. The spherical shape of the wheels causes them to automatically seek a central position between the two parallel track rails and to follow this central position throughout the entire route of the track.

The track may be formed from an extruded or preformed metal strip shaped to provide a bearing channel 39 having a concave arcuate contour corresponding to the spherical radius of the wheels 12 and 13, and with an outwardly extending base portion 40 which can be secured to the ties 11 by means of suitable lag screws or other attachment devices 41.

For more economical construction, the track could be formed from a simple wooden track strip 42, as shown in Fig. 3, one corner of which is milled away to form a track groove or wheel rest 43.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A child's riding device comprising: a pair of hollow, oblate spheroids, each spheroid having flattened sides; an axle member extending horizontally through each spheroid concentrically of the flattened sides thereof; a frame mounted on the extremities of said axle members and extending between and above said spheroids for supporting a child thereon and thereover; and a pair of parallel, spaced-apart track rails, said spheroids resting between and being supported by said rails, the frictional contact between said spheroids and said rails acting to maintain said frame in an upright position, and the spherical periphery of said spheroids acting to center said frame between said rails.

2. A child's riding device as described in claim 1 having circular mounting discs secured to the flattened sides of said spheroids, said axle members extending through and being affixed in said mounting discs; and means for rotating one of said axle members.

References Cited in the file of this patent

UNITED STATES PATENTS

| | | |
|---|---|---|
| 242,161 | Scuri | May 31, 1881 |
| 622,477 | Huck | Apr. 4, 1899 |
| 1,145,803 | Schlossberg | July 6, 1915 |
| 2,047,148 | Koelkebeck | July 7, 1936 |
| 2,395,383 | White | Feb. 19, 1946 |
| 2,473,574 | Davis | June 21, 1949 |